(No Model.) 2 Sheets—Sheet 1.

T. B. ATTERBURY.
GLASS MOLD AND THE MANUFACTURE OF GLASS ARTICLES.

No. 276,327. Patented Apr. 24, 1883.

Witnesses:

Inventor:
Thos. B. Atterbury (No Model.) 2 Sheets—Sheet 2.

T. B. ATTERBURY.
GLASS MOLD AND THE MANUFACTURE OF GLASS ARTICLES.
No. 276,327. Patented Apr. 24, 1883.

Witnesses:
T. C. Brecht
D. P. Berg

Inventor:
Thos B Atterbury

UNITED STATES PATENT OFFICE.

THOMAS B. ATTERBURY, OF PITTSBURG, PENNSYLVANIA.

GLASS-MOLD AND THE MANUFACTURE OF GLASS ARTICLES.

SPECIFICATION forming part of Letters Patent No. 276,327, dated April 24, 1883.

Application filed January 20, 1883. (No model.)

*To all whom it may concern:*

Be it known that I, THOMAS B. ATTERBURY, a citizen of the United States, residing at Pittsburg, in the county of Allegheny and State of Pennsylvania, have invented certain new and useful Improvements in Glass-Molds and in the Manufacture of Glass Articles; and I do hereby declare the following to be a full, clear, and exact description of the invention, such as will enable others skilled in the art to which it appertains to make and use the same.

My invention relates to the manufacture of glass vessels provided with a guard, cap, or flange which partially incloses the upper portion of the cavity to prevent the contents of the vessel from coming in contact with the mustache, to hold back the froth or foam of aerated or malt liquids, and also to prevent the ice which may be in the vessel from being poured out or from coming in contact with the lips of the person drinking from such vessel.

To this end my invention consists of a mold having a cavity therein, in which the article is formed, a smaller cavity connected therewith, in which a flap, flange, or film of glass is formed, one portion of which is attached to the upper portion of the article, so that it can be reheated when withdrawn from the mold, turned over, and joined to the upper edge of the article, so as to form a shield or guard.

My invention consists, further, in certain details of construction of the molds and the manner of operating the same, as will more fully hereinafter appear.

Figure 1:
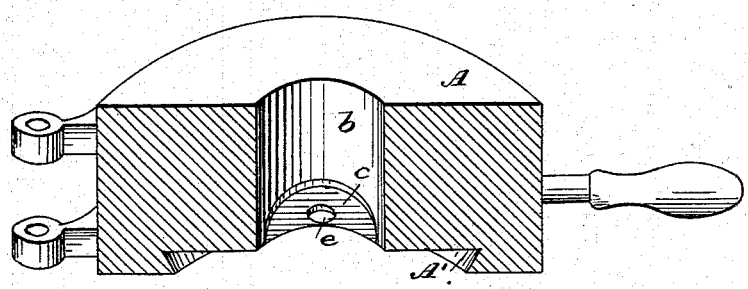
Figure 2:
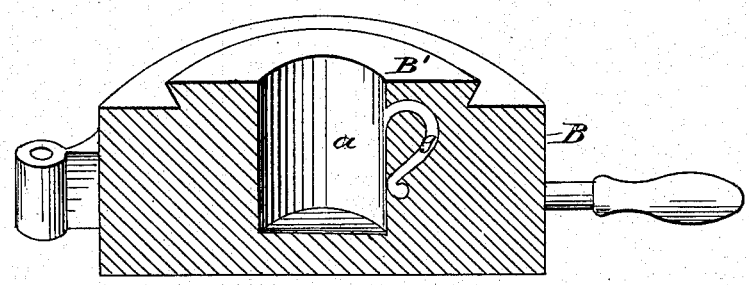
Figure 3:
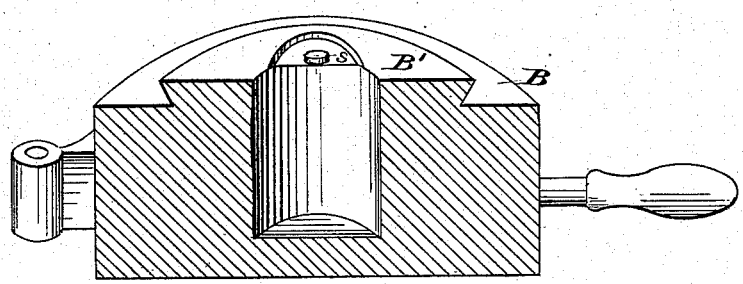
Figure 8:
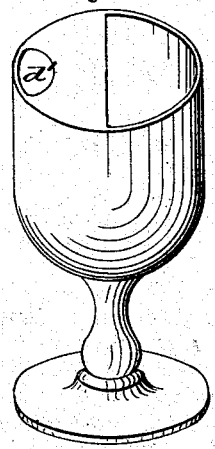
Figure 4:
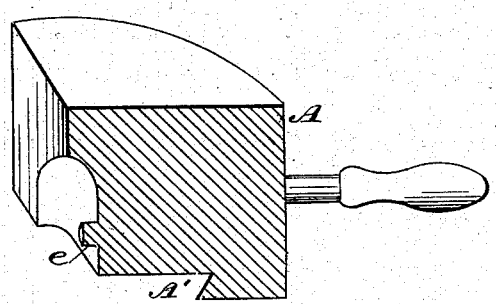
Figure 5:
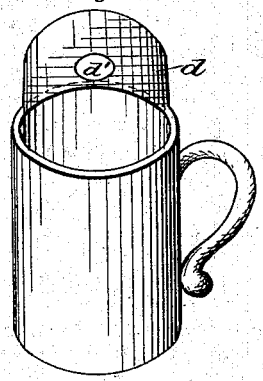
Figure 6:
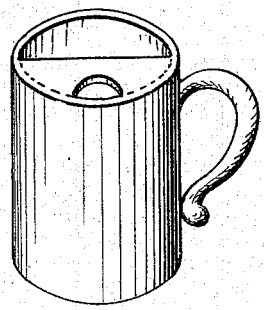
Figure 9:
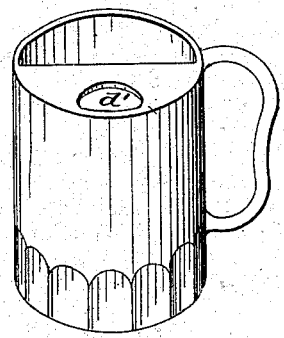
Figure 7:
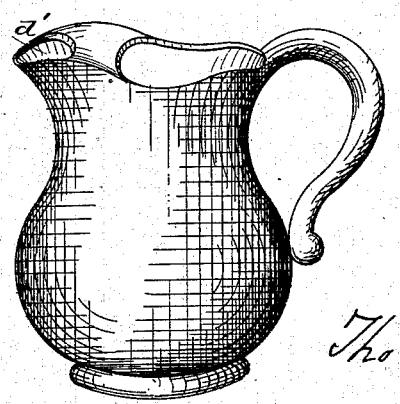

Figure 1 is a sectional view of the upper half of the mold in which the flange or flap is formed. Fig. 2 is a sectional view of the lower portion of the mold in which the article is formed. Fig. 3 is a sectional view of a modification, showing the recess in which the flap or flange is formed, located in the upper side of the lower mold-section. Fig. 4 is a sectional view of a portion of the upper section of the mold, taken through the stud or projection which forms the hole or opening in the flap or flange. Fig. 5 is a view in perspective of a beer-mug partly finished, and just as it comes from the mold, before the flap or flange is turned down. Figs. 6 and 8 are views in perspective of beer-mugs as completed, with the flange or flap folded over and welded to the top of the vessel. Fig. 7 is a perspective view of a pitcher made according to my invention. Fig. 9 is a view in perspective of a goblet with the guard formed thereon.

Referring to the drawings, A designates one half portion of the upper section of the mold, and B the lower half section. The sections are hinged together, and are provided with a dovetailed cavity, A', and a dovetailed projection or tongue, B', by which the upper and lower sections are securely held together when in position for work, as is the usual form of this class of glass molds.

The lower section, B, is provided with a cavity, a, in which the article to be made is formed, and said cavity may be made of any desired configuration to form different kinds of articles. In the present instance a cavity for forming a beer-mug is shown, in which the body of the article, together with the handle, is pressed in a single operation.

The upper section is provided with an opening, b, through which the pressing-plunger passes into the cavity of the lower section.

In one side of the opening b is formed a cavity, c, which communicates with the cavity a of the lower section when the parts of the mold are put together. The cavity c is for the purpose of forming the flap or flange d, (see Fig. 5,) the molten glass in the lower section, B, when subject to the pressure of the plunger, being forced up into the cavity c.

The cavity c is provided with a stud or projection, e, which projects inward the full thickness of the glass or the full depth of the cavity, so that the plunger, in its descent, barely passes it. The office of this stud or projection is to form a hole or perforation, d', in the flange or flap d, so that when the flap or flange is turned down on the top of the article a drinking-orifice will be formed in the top of the article. The shape of this orifice or opening, and the plug for forming the same, is shown as round in cross-section; but it is obvious that it may be made of any shape, and in practice I may prefer to make it in the shape of a segment of a circle.

In some instances it may be desirable to form a hole or cavity through the upper section of the mold, to receive a movable plug for forming the cavity in the flap or flange, instead of the fixed rigid stud $e$, as shown. This movable plug may be operated by a spring or lever, or in any convenient or desirable manner.

In Fig. 3 I have shown a modification in which the cavity for forming the flap or flange is located in the upper surface of the lower mold-section and at right angles to the cavity $a$. In this form of construction the bottom of the upper mold-section forms the upper wall of the cavity, while a pin or stud, $f$, located therein, forms the opening in the flange or flap, as heretofore described with reference to the stud $e$.

The operation of pressing an article of glass with a flap or flange thereon is as follows: The mold-sections having been properly placed together and secured, the molten glass is dropped into the cavity $a$ of the lower section. The plunger is then brought down, and the glass is forced into the cavity $c$ and around the studs $e$ or $f$, as the case may be, and also into the cavity $g$ for forming the handle on the article. The plunger is then withdrawn and the article removed from the mold. The article is now placed into a snap or holder, reheated, and the flange or flap turned down over the top of the article and welded thereto, and trimmed, if need be, to any desired form. This process of reheating and joining the flap or flange at its free end to the top of the article also fire polishes the article and makes it smooth.

I do not wish to limit myself to the manufacture of beer-mugs, goblets, glasses, and other drinking-vessels, as it is obvious that water-pitchers, molasses-pitchers, cream-jugs, gravy-dishes, and a great variety of articles can be formed according to my invention.

It will thus be seen that I form articles from which beer and aerated liquids can be drunk without annoyance to the drinker, and a perfect guard for the mustache formed; also a guard for preventing the ice from coming in contact with the lips, or preventing it from being poured out with the water or other liquid.

Having thus described my invention, what I claim, and desire to secure by Letters Patent, is—

1. A glass-mold provided with a cavity for forming the main body of the article, and a supplemental cavity connected therewith, in which is formed a flange or flap, one end of which is secured to the main body of the article, as set forth.

2. A glass-mold provided with a cavity for forming the main body of the article, and a supplemental cavity connected therewith for forming a flange or flap on the glass article, said supplemental cavity being provided with a stud or pin to form a hole or perforation in the flange or flap, as set forth.

3. The mold for glass vessels in which to the recess for the body of the article is connected a recess for a shield-flange, which will thus be formed on one side of the body of the molded vessel.

4. The mold for forming glass vessels, provided with a recess for forming a shield-flange, connected to the recess for forming the body of the article, and with a stud or pin in the former recess to form a perforation in said flange.

5. The combination of the mold-section A, provided with the cavity $c$ and stud $e$, with the mold-section B, provided with the cavity $a$, and a suitable pressing device, whereby an article of glass is formed with an attached flange or flap, as set forth.

6. The method of providing glass vessels with shield-flanges, consisting of molding onto one side of the body a projecting flange, and then bending said flange down over and securing it to the top of the body.

7. The method of providing glass vessels with shield-flanges, consisting of molding onto one side of the body a perforated flange, and then bending said flange down over and securing it to the top of the body of the article, as set forth.

8. The method herein described of forming mugs, goblets, pitchers, and like articles of glass with a guard thereon, the same consisting in pressing or otherwise forming the article with a perforated flange or flap thereon, then reheating the article, and joining the free end of the flap or flange to the top edge of the article to form a shield or guard, as set forth.

9. The glass vessel having a shield-flange formed integral with its body, substantially as described.

10. The glass vessel having a shield-flange formed integral with its body, and bent over and secured to its top, substantially as described.

11. The glass vessel having a perforated shield or guard flange formed integral with its body, and bent over and secured to its top, substantially as described.

12. A new article of manufacture, a glass mug, goblet, pitcher, or other vessel provided with a guard or flange of the same material and integral therewith, said guard or flange extending across a portion of the top or opening, and having therein a drinking-orifice, as set forth.

In testimony whereof I affix my signature in presence of two witnesses.

THOS. B. ATTERBURY.

Witnesses:
D. P. BERG,
JULIUS STENGEL.